(12) United States Patent
Michael et al.

(10) Patent No.: US 7,716,642 B1
(45) Date of Patent: May 11, 2010

(54) TECHNIQUES FOR DETECTING CODING INCOMPATIBILITIES

(75) Inventors: Ofer E. Michael, Newton, MA (US); Josef Ezra, Ashland, MA (US); Dar S. Efroni, Ashland, MA (US)

(73) Assignee: EMC Corporation, Hopkinton, MA (US)

( * ) Notice: Subject to any disclaimer, the term of this patent is extended or adjusted under 35 U.S.C. 154(b) by 1191 days.

(21) Appl. No.: 11/120,602

(22) Filed: May 3, 2005

(51) Int. Cl.
*G06F 9/44* (2006.01)

(52) U.S. Cl. ............................ 717/124; 717/126

(58) Field of Classification Search ............... 717/126
See application file for complete search history.

(56) References Cited

U.S. PATENT DOCUMENTS

| | | | |
|---|---|---|---|
| 5,432,795 A | 7/1995 | Robinson | |
| 5,488,714 A | 1/1996 | Skidmore | |
| 5,666,519 A | 9/1997 | Hayden | |
| 5,764,947 A | 6/1998 | Murphy et al. | |
| 5,774,719 A | 6/1998 | Bowen | |
| 5,819,252 A | 10/1998 | Benson et al. | |
| 5,845,064 A | 12/1998 | Huggins | |
| 5,926,636 A * | 7/1999 | Lam et al. | 719/313 |
| 6,249,822 B1 * | 6/2001 | Kays et al. | 719/330 |

OTHER PUBLICATIONS

Pericom, Application Brief AB34. "Big Endian to Little Endian Data Conversion Using 3.3V Bus Switches," by Refugio Jones. Aug. 18, 1999.
Explanation of Big Endian and Little Endian Architecture http://support.microsoft.com/kb/q102025, Nov. 20, 2003.

* cited by examiner

*Primary Examiner*—Wei Y Zhen
*Assistant Examiner*—Phillip H Nguyen
(74) *Attorney, Agent, or Firm*—Muirhead and Saturnelli, LLC

(57) ABSTRACT

Described are techniques for detecting incompatibilities. A first contents of a data item is determined in accordance with a first set of conventions associated with a first processor architecture. A second contents of said data item is determined in accordance with a second set of conventions associated with a second processor architecture and including at least one convention that is not included in said first set. An actual difference between the first contents and the second contents is determined. It is determined whether the actual difference is expected. If the actual difference is not expected, the data item is flagged as an incompatibility candidate. Code referencing the data item is examined to determine any coding incompatibilities due to coding dependencies.

20 Claims, 9 Drawing Sheets

TECHNIQUES FOR DETECTING CODING INCOMPATIBILITIES

BACKGROUND

1. Technical Field

This application generally relates to code and processor architectures, and more particularly to techniques used in connection with detecting incompatibilities and coding dependencies.

2. Description of Related Art

A computer system may include one or more central processing units (CPUs) coupled to a memory and other components, such as I/O devices. A computer system may be used to perform a variety of processing tasks and operations. Binary images or machine executable programs may include instructions and data used in connection with performing a particular task. The instructions may be executed by the CPU and may cause the CPU to access the data at one or more locations. The instructions and/or data associated with an executable program may be produced specifically for use with a particular CPU architecture or family of processors. The CPU architecture may also follow certain conventions, for example, when handling memory storage such as accessing the data.

The executable program may be produced from source code written in a programming language. The source code may be produced by a programmer or other automated coding technique and used in connection with generating a first machine executable program for execution on a first CPU architecture. The first CPU architecture may operate in accordance with a first set of conventions. The source code may be written in such a way that there are dependencies on one or more of the first set of conventions. Problems may arise when the same source code is used to produce a second machine executable program for execution on a second CPU architecture having a different second set of conventions. The coding dependencies upon the first set of conventions may result in the first machine executable program operating as expected for the first CPU architecture and associated conventions, but may result in the second machine executable program, associated with the second CPU architecture and conventions, operating in an incompatible manner and producing unexpected results.

Thus, it may be desirable to detect such occurrences of incompatibilities with different architectures and/or conventions as may be associated with different computing environments.

SUMMARY OF THE INVENTION

In accordance with one aspect of the invention is a method for detecting incompatibilities comprising: determining a first contents of a data item in accordance with a first set of conventions associated with a first processor architecture; determining a second contents of said data item in accordance with a second set of conventions associated with a second processor architecture and including at least one convention that is not included in said first set; determining an actual difference between said first contents and said second contents; determining whether said actual difference is expected; and if said actual difference is not expected, determining said data item as an incompatibility candidate. The method may also include: determining an expected difference using one of said first contents or said second contents; and comparing said expected difference to said actual difference. The first set of conventions may include at least a first convention specifying that data is stored in a memory accordance with a first byte ordering and said second set of conventions includes at least a second convention specifying that data is stored a memory in accordance with a second different byte ordering. The first convention may specify that a most significant byte of data of said data item is stored in a lowest memory address of a storage location associated with said data item. The second convention may specify that a least significant byte of data of said data item is stored in a lowest memory address of a storage location associated with said data item. The method may also include: determining a source code statement including at least one reference to said data item wherein said source code statement includes code written in accordance with one of said first convention or said second convention causing said actual difference to vary from said expected difference. The first processor architecture may be included in a component of a first type in a first data storage system, and said second processor architecture may be included in component of said first type in a second data storage system. The method may also include determining at least one of a first address associated with a first memory location of said first contents or a second address associated with a second memory location of said second contents using debug symbol table information. The method may also include: preparing a first code set including debug information for execution by said first processor architecture; and preparing a second code set including debug information for execution by said second processor architecture, said first and second code sets being produced using at least a same portion of source code, said portion of source code including at least one source code statement referencing said data item, said at least one source code statement being written in accordance with a first convention included in only one of said first or said second sets of conventions, said at least one source code statement causing said actual difference to be unexpected.

In accordance with another aspect of the invention is a system comprising: a first data storage system including a first processor architecture operating in accordance with a first set of conventions; a second data storage system including a second processor architecture operating in accordance with a second set of conventions including at least one convention that is not included in said first set; a host comprising code that: determines an actual difference between a first contents of a data item stored in said first data storage system and a second contents of said data item stored in said second data storage system; determines whether said actual difference is expected; if said actual difference is not expected, determining said data item as an incompatibility candidate. The first set of conventions may include a first convention specifying that a most significant byte of data of said data item is stored in a lowest memory address of a storage location associated with said data item, and said second set of conventions may include a second convention specifying that a least significant byte of data of said data item is stored in a lowest memory address of a storage location associated with said data item, and said host may further comprise code that: determines an expected difference using one of said first contents or said second contents and compares said expected difference to said actual difference.

In accordance with another aspect of the invention is a computer program product that detects incompatibilities comprising code that: determines a first contents of a data item in accordance with a first set of conventions associated with a first processor architecture; determines a second contents of said data item in accordance with a second set of conventions associated with a second processor architecture and including at least one convention that is not included in said first set; determines an actual difference between said first contents and said second contents; determines whether said actual difference is expected; and if said actual difference is not expected, determines said data item as an incompatibility candidate. The computer program product may also include code that: determines an expected difference using one of said first contents or said second contents; and compares said expected difference to said actual difference. The first set of conventions may include at least a first convention specifying that data is stored in a memory accordance with a first byte ordering and said second set of conventions may include at least a second convention specifying that data is stored a memory in accordance with a second different byte ordering. The first convention may specify that a most significant byte of data of said data item is stored in a lowest memory address of a storage location associated with said data item. The second convention may specify that a least significant byte of data of said data item is stored in a lowest memory address of a storage location associated with said data item. The computer program product may further comprise code that: determines a source code statement including at least one reference to said data item wherein said source code statement includes code written in accordance with one of said first convention or said second convention causing said actual difference to vary from said expected difference. The first processor architecture may be included in a component of a first type in a first data storage system, and said second processor architecture may be included in component of said first type in a second data storage system. The computer program product may also include code that determines at least one of a first address associated with a first memory location of said first contents or a second address associated with a second memory location of said second contents using debug symbol table information. The computer program product may also include code that: prepares a first code set including debug information for execution by said first processor architecture; and prepares a second code set including debug information for execution by said second processor architecture, said first and second code sets being produced using at least a same portion of source code, said portion of source code including at least one source code statement referencing said data item, said at least one source code statement being written in accordance with a first convention included in only one of said first or said second sets of conventions, said at least one source code statement causing said actual difference to be unexpected.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
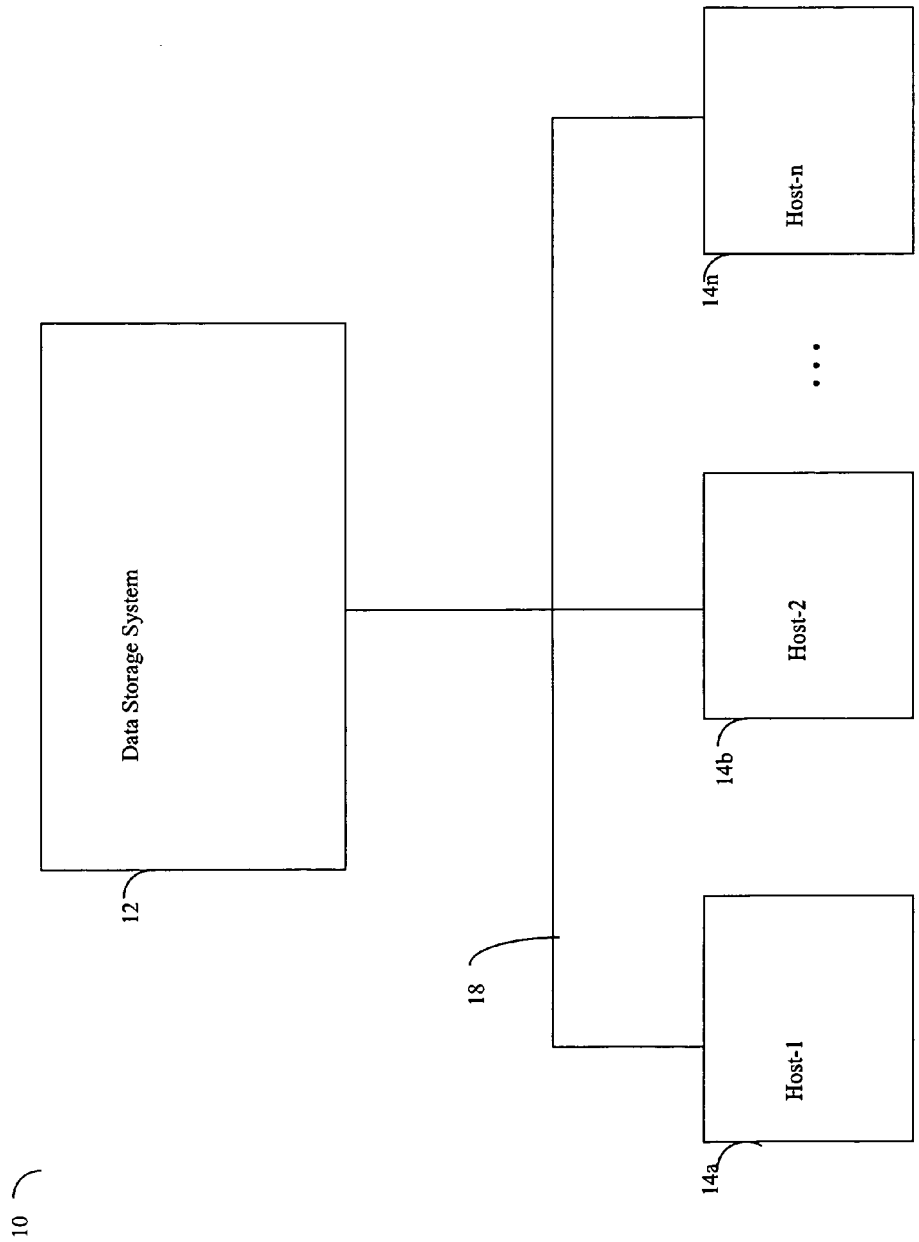
FIG. 1 is an example of an embodiment of a computer system that may utilize the techniques described herein.

Referring now to FIG. 1, shown is an example of an embodiment of a computer system that may be used in connection with performing the techniques described herein. The computer system 10 includes a data storage system 12 connected to host systems 14*a*-14*n* through communication medium 18. In this embodiment of the computer system 10, and the N hosts 14*a*-14*n* may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14*a*-14*n* may access and communicate with the data storage system 12, and may also communicate with others included in the computer system 10.

Each of the host systems 14*a*-14*n* and the data storage system 12 included in the computer system 10 may be connected to the communication medium 18 by any one of a variety of connections as may be provided and supported in accordance with the type of communication medium 18. The processors included in the host computer systems 14*a*-14*n* may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14*a*-14*n* and data storage system may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, iSCSI, and the like. Some or all of the connections by which the hosts, management component(s), and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14*a*-14*n* may issue a data request to the data storage system 12 to perform a data operation. For example, an application executing on one of the host computers 14a-14n may perform a read or write operation resulting in one or more data requests to the data storage system 12.

Figure 2A:
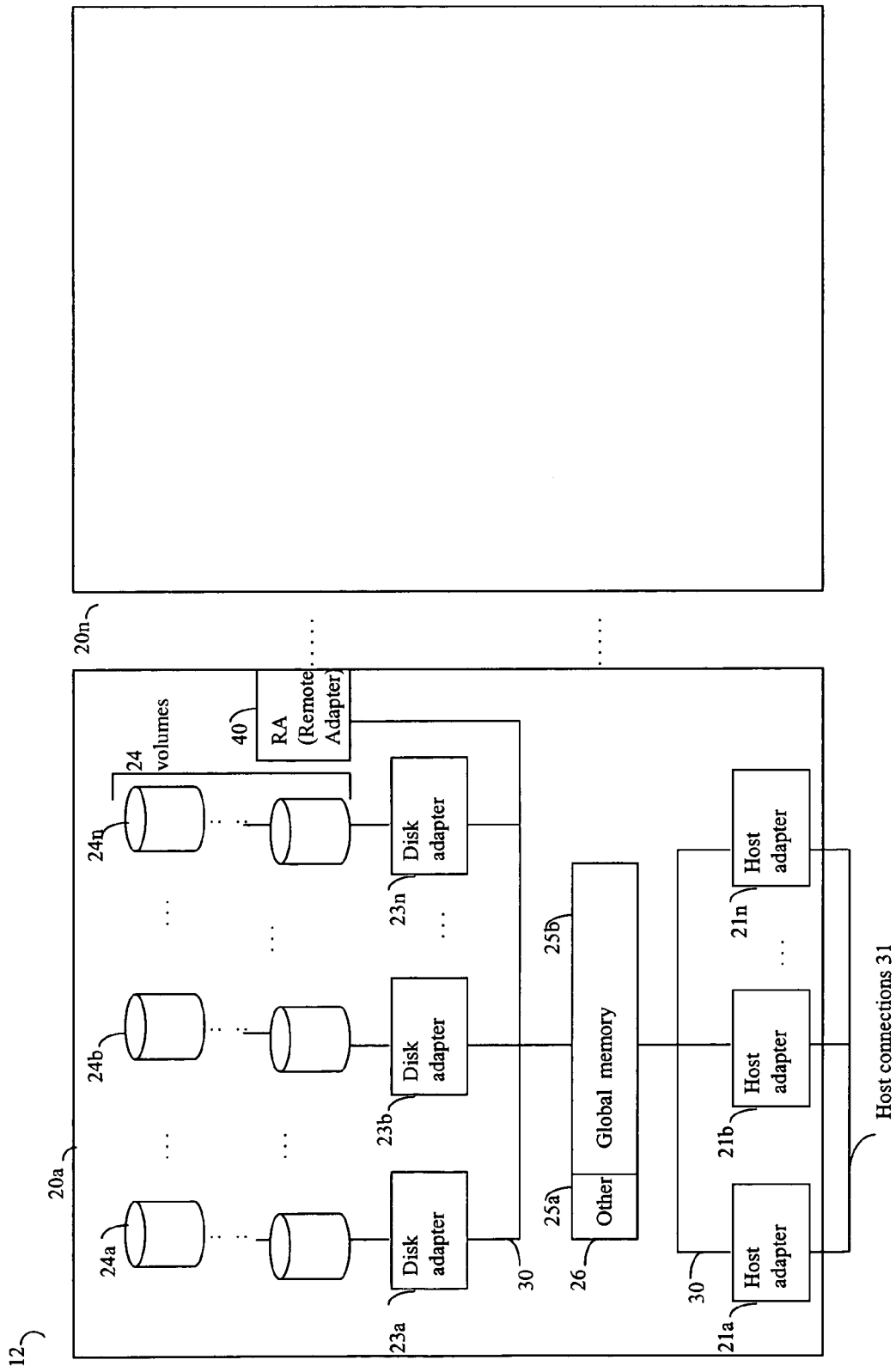
FIG. 2A is an example of an embodiment of a data storage system.

Referring now to FIG. 2A, shown is an example of an embodiment of the data storage system 12 that may be included in the computer system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the computer system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

One or more internal logical communication paths may exist between the DA's, the remote adapters (RA's), the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on an LV may be accessed by the DA following a data request in connection with I/O operations that other directors originate.

Figure 2B:
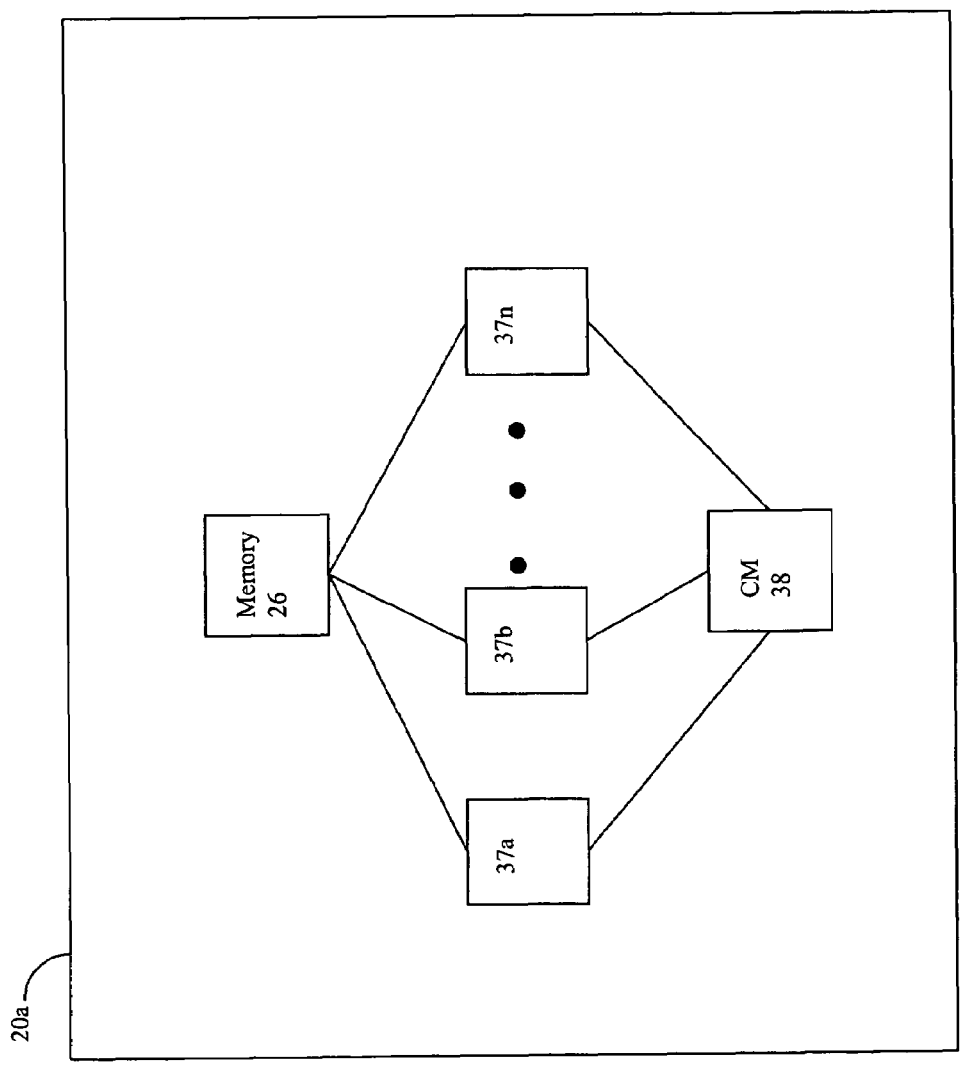
FIG. 2B is a representation of the logical internal communications between the directors and memory included in one embodiment of data storage system of FIG. 2A.

Referring now to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary.

The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

Referring back to FIG. 2A, a component within a data storage system, such as a DA 23a, may include its own processor and other elements.

Figure 2C:
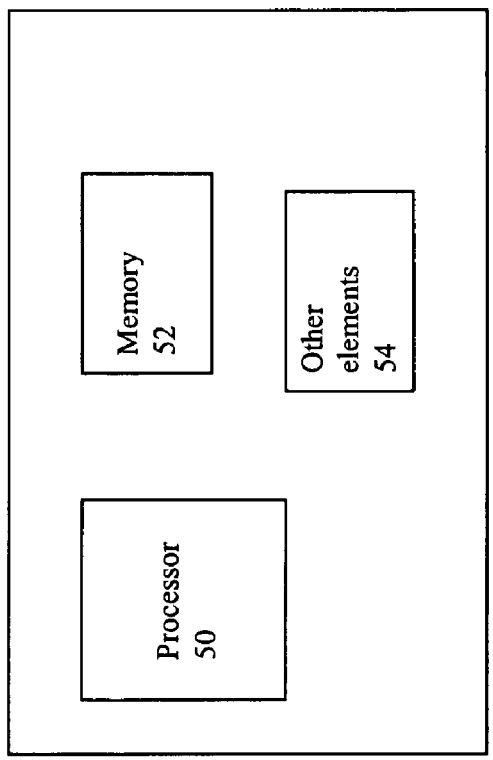
FIG. 2C is an example representation of components that may be included in a disk adapter (DA)

Referring now to FIG. 2C, shown is an example of components that may be included within a disk adaptor (DA), such as 23a of FIG. 2A. In this example representation, the DA 23a may include a processor 50, a memory 52 local to the DA, and one or more other elements 54. It should be noted that other components of a data storage system, such as the host adaptor (HA), the remote adaptor (RA), and the like, may also include one or more processors, memory, and other elements associated with each of these components. A processor 50 of DA 23a may operate in accordance with a particular instruction set and a particular architecture for handling memory storage. For example, the DA 23a may operate in accordance with a Big Endian format or a Little Endian format when accessing memory such as memory 52 local to the processor of the DA 23a. Similarly, another processor within components of another data storage system may operate in accordance with a different instruction set and in accordance with a different architecture for handling memory storage. For example, the DA 23a may include a processor 50 that operates in accordance with Big Endian architecture. Another data storage system may include another component with a processor that operates in accordance with Little Endian architecture for handling memory storage.

As known to those of ordinary skill in the art, Big Endian and Little Endian describe an ordering or sequence in which multi-byte data is stored in memory. Byte order storage may impact the compatibility between devices within and outside of a system. The order in which the data is stored into memory, such as memory 52 of a particular DA or other component in the data storage system, may vary in accordance with the particular hardware. Big Endian and Little Endian each refer to a particular ordering in which bytes are stored in memory. Little Endian formatting specifies that the least significant byte is stored in the lowest memory address. Examples of Little Endian processor architecture include, for example, IA32 and IA64 architecture, and the like, used by Intel, AMD and other CPU vendors. In contrast, Big Endian formatting takes the most significant byte and stores it in the lowest memory address. Examples of a Big Endian processor architecture include, for example, the PowerPC and MIPS architecture, used by, IBM, Motorola, PMC, and other CPU vendors.

Figure 3:
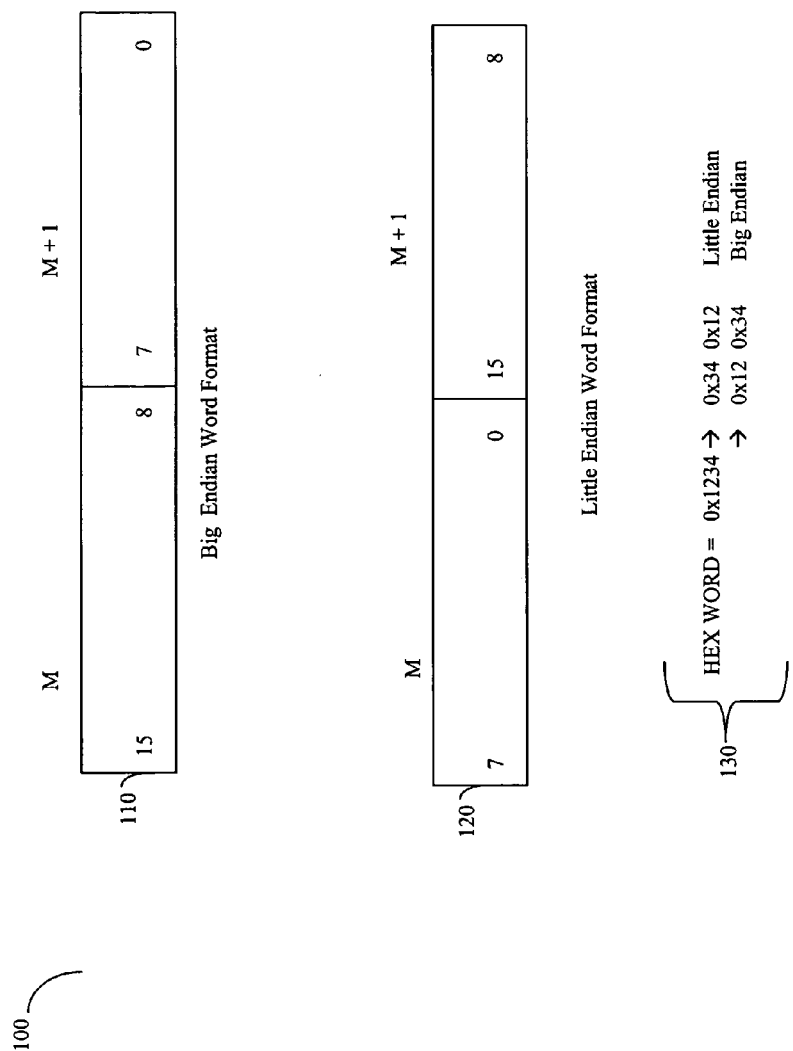
FIG. 3 is an example illustrating storage of a data element in accordance with a Little Endian and Big Endian format.

Referring now to FIG. 3, shown is an example 100 illustrating how a same data element may be stored in accordance with both a Little Endian word format and a Big Endian word format. Although the example 100 illustrates the difference in data formatting for a 16-bit word, the same formatting may be extended to data elements having additional bytes. Element 110 illustrates a Little Endian word format in which the least significant data byte is stored in the lowest memory address. As illustrated in 100, M corresponds to the most significant data byte. Element 120 illustrates a Big Endian word format where the most significant byte, M, is stored in the lowest memory address. Element 130 illustrates how hex word x1234 has its byte ordering reversed or "byte swapped" in accordance with a word format for a Little Endian representation and a Big Endian representation.

As previously described, it may be the case that a processor architecture of a first data storage system operates in accordance with a Big Endian representation for handling memory storage and a second different data storage system may operate in accordance with a Little Endian byte ordering when accessing locations in memory.

A problem may arise, for example, when code written to execute in accordance with assumptions made for a Big Endian format is ported for execution and use in an environment which operates in accordance with the Little Endian format. Code written in accordance with assumptions or dependencies for a Little Endian environment may operate inconsistently when executed by a processor architecture that operates in accordance with the Big Endian environment. Similarly, code written in accordance with assumptions or dependencies for the Big Endian format may operate inconsistently when executed in a Little Endian environment. It may be desirable to detect such inconsistencies associated with handling memory storage associated with code which operates in a Big Endian environment and a Little Endian environment. What will now be described are techniques that may be used in detecting data incompatibilities associated with code written in accordance with a set of dependencies or assumptions causing the code to operate properly only in one of the Big Endian or Little Endian environments. Thus, when the code is ported to operate in the other of the Big Endian or Little Endian environment, the code and data accesses may not operate as expected due to these coding dependencies or assumptions.

In one embodiment as will be illustrated herein, a first data storage system may operate in accordance with a Big Endian architecture and a second data storage system may operate in accordance with a Little Endian architecture. It may be desirable to have a common set of source code modules used to produce both a first set of executable code for execution in the Big Endian environment as well as a second set of executable code for execution in the Little Endian environment. The techniques that will now be described may be used in connection with detecting data anomalies or incompatibilities when comparing the data accesses for a same data item in the Big Endian and Little Endian environments.

It should be noted that although the techniques described herein refer to two data storage systems each operating in accordance with one of a Big Endian and Little Endian architecture, the techniques described herein may be used to identify data incompatibilities for processor architectures included in components other than data storage systems.

Figure 4:
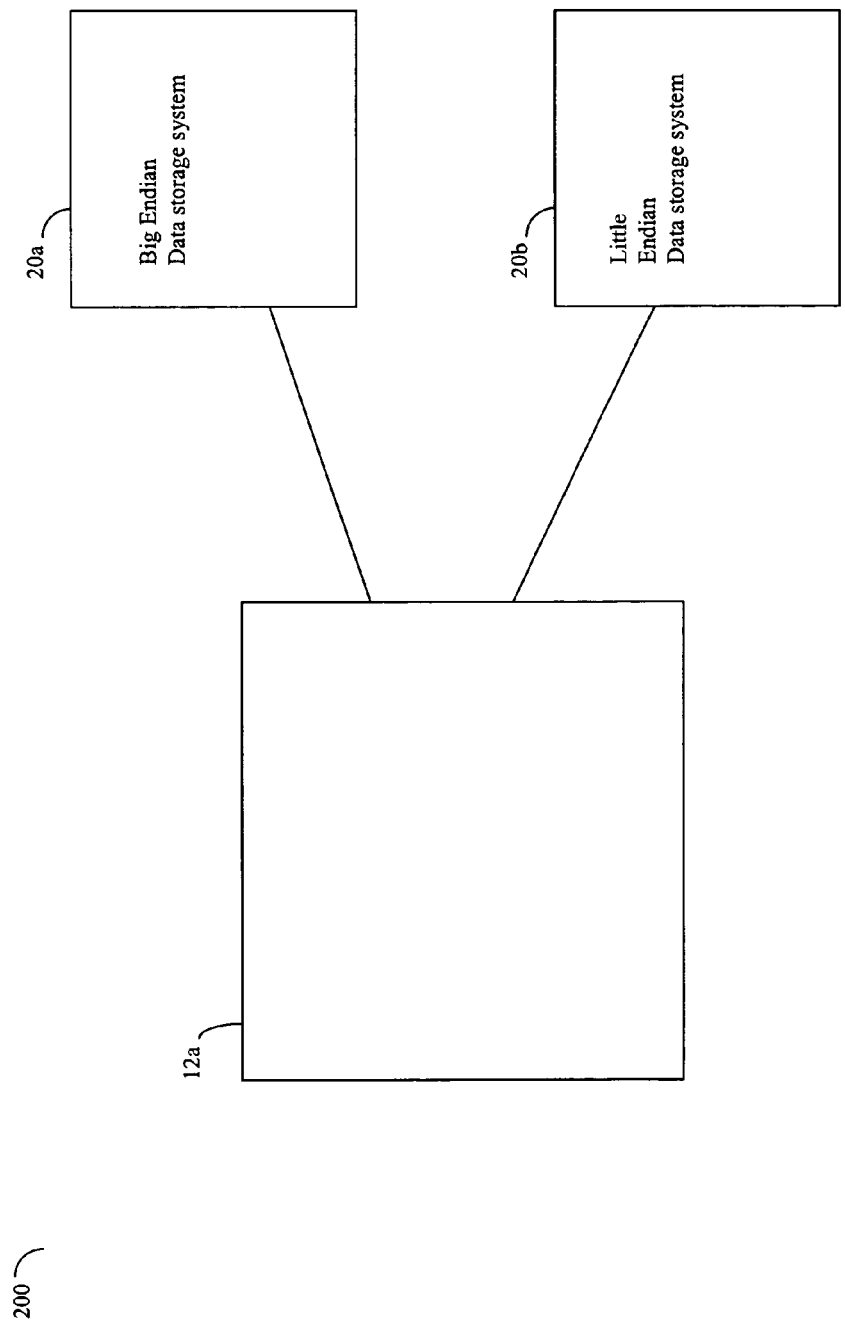
FIG. 4 is an example of components that may included in an embodiment and used in connection with performing the techniques described herein.

Referring now to FIG. 4, shown is an example 200 of components that may be used in connection with performing the techniques described herein. The components included in the example 200 are a subset of those previously described in connection with an embodiment of FIG. 1. In this example, a host computer system such as 12a may be used in connection with a first set of executable code that is executed on data storage system 20a and second set of executable code that is executed on data storage system 20b. In this example, data storage system 20a may operate in accordance with a Big Endian architecture for handling memory storage and data storage system 20b may operate in accordance with a Little Endian architecture for handling memory storage. The host system 12a may be used in connection with performing the techniques described herein for detecting data incompatibilities that may be associated with code executing on data storage systems 20a and 20b. In one embodiment, the system 12a may be, for example, a personal computer with a LINUX-based operating system executing thereon. The executable code for which data incompatibilities are being determined may be executed, for example, by a processor such as may be included in a first DA of the data storage system 20a and a second DA of the data storage system 20b.

The techniques described herein examine and compare the contents of memory used by the first DA of data storage system 20a with the contents of memory used by the second DA of data storage system 20b. For a particular data item, a first address of that data item in 20a and a second address of that data item in 20b are determined. The contents of the first address are compared to the contents of the second address to determine if any data incompatibility exists. In other words, a determination is made as to whether the difference between the contents of both locations is an expected difference in accordance with the Big Endian and Little Endian data formatting. If the difference is as expected, then the source code associated with accessing this data item is not a candidate for a coding incompatibility.

What will now be described is a representation of the expected difference between a data item accessed in the Little Endian environment and the same data item accessed in the Big Endian environment. If LEM represents the particular data item representation in the Little Endian environment, then the expected format of that data item in the Big Endian environment may be represented as BEM (expected) so that generally the following should hold true:

(f(LEM(actual))$^{-1}$)=BEM(expected)

where $f(x)^{-1}$ represents the byte swap of the data element x. In other words, if a first actual data item is in the Little Endian format (e.g., LEM (actual)), the first data item's byte ordering may be swapped to determine what the value of the first data item is expected to be in accordance with a Big Endian representation (e.g., BEM (expected)). The data value corresponding to the foregoing expected result (e.g., BEM (expected)) can be compared to another data value of the first data item actually read from the memory associated with a Big Endian architecture (e.g., BEM (actual)). If the two values (e.g., BEM (actual) and BEM (expected)) are not the same, then the current data item is flagged as an incompatibility candidate. The source code statement associated with the current data access of the data item may be examined based on this detected data incompatibility to determine if the source code represents a coding incompatibility. In other words, the associated source code may be written in accordance with data dependencies or assumptions which are not valid in both the Big and Little Endian environments. Thus, the null hypothesis, H0, may represent the instance where there is no incompatibility associated with a current data access and associated code and the following holds true:

(f(LEM)$^{-1}$)=BEM (expected) and
BEM(expected)=BEM (actual)

wherein

"BEM (expected)" is the expected data value produced from the actual Little Endian formatted data value read from the memory of data storage system 20*b*, and "BEM (actual)" is the actual Big Endian formatted data value as may be read from data storage system 20*a*.

H1 may represent the instance where H0 evaluates to false such that a possible incompatibility is detected.

It should be noted that the following also holds true:

(f(BEM)$^{-1}$)=LEM (expected) and
LEM(expected)=LEM (actual)

wherein

"LEM (expected)" is the expected data value produced from the actual Big Endian formatted data value read from the memory of data storage system 20*a*, and "LEM (actual)" is the actual Little Endian formatted data value as may be read from data storage system 20*b*.

The host 12*a* may execute code which controls the detection of data and coding incompatibilities. As will be described in more detail in following paragraphs, the host 12*a* may perform processing which controls the execution of code in the data storage systems 20*a* and 20*b* and the examination of the contents of a particular data item in both the Big Endian and Little Endian environments. Although not explicitly stated in connection with the following description, communications may be made between the host 12*a* and each of the data storage system 20*a* and 20*b* in order to transmit commands from the host to the data storage systems to control the execution of the code on each of the data storage systems. Data may also be transmitted from the data storage systems to the host, for example, in order to examine a value of a data item as may be stored within each of the data storage systems. In one example illustration, the techniques described herein may be used in connection with detecting data incompatibilities associated with code executed by a DA in 20*a* and a DA in 20*b*. An incompatibility candidate may be determined by examining the contents of memory associated with each DA, such as a memory element 52 that may be local to each of the DAs included in 20 and 20*b*.

Data incompatibilities may result from coding as may be associated with, for example, type casting as may be performed in C and C++. The following represents what may be characterized as one example of coding causing a data incompatibility between the Big Endian and Little Endian environments because the same source code will produce different results in each environment:

```
int *p;
int j;
p=& j;
*(short *p)=0x1234;
*((short *p)++)=0xABCD;
```

Following are some additional code examples causing data incompatibilities and different results on Big Endian and Little Endian architectures.

The following example illustrates an incompatibility caused by the coding dependency for reading or writing only part of a number:

```
UINT32 value;
UINT16 hi, lo;
value=0x12345678'
hi=((UINT16*) &value) [0];
lo=((UINT16*) &value) [1];
```

The following example illustrates an incompatibility caused by code that may read or write multiple numbers at once:

```
UINT16 block_range[2];
*((UINT32*) block_range)=0x00080010;
```

The following example illustrates an incompatibility caused by code that may read or write a struct as an integer:

```
struct {
    UINT8 cmd;
    UINT8 flags;
    UINT16 dev;
} rec;

*((UINT32*) &rec)=0x28004567;
```

The following example illustrates an incompatibility caused by code that may read or write values in protocol structures or device registers:

```
UINT8 cdb [32];
*((UINT16) &cdb[0])=lun;
*((UINT16*) &cdb[2])=siz;
*(UINT32*) &cdb[4])=block number;
```

The following example illustrates an incompatibility caused by code that has a dependency on sizes of different types in an architecture. Additionally, language processors, such as compilers processing C or C++ code, may also vary sizes associated with certain data types. As an example, the following code may produce different results in accordance with the sizes of the data types that may vary with processor architecture and/or the selections made by a particular compiler or other processor of code:

```
typedef struct {
    USHORT device;
    USHORT target_number;
    ULONG record_offset;
    ULONG record_size;
} T_RECORD_INFO;
```

The size of the foregoing struct may vary with processor architecture and/or language processor. For example, if data types of int, long, and all pointers are 32 bits, the C sizeof function returns 12. If the data type of int is 32 bits and long and pointer are 64 bits, then the sizeof function returns 24.

As another example, the size of a pointer variable may vary as well as whether data is aligned, the particular alignment boundary requirements, and the like.

It should be noted that coding dependencies may be dependent on one or more aspects of a computer architecture making the code non-portable. Although Big Endian vs. Little Endian formatting (e.g., byte ordering) is an example of one such aspect of a processor architecture described herein in more detail, it should be noted that CPU architectures may also vary in accordance with other aspects such as, for example, different word sizes, alignment requirements, and the like, some of which are illustrated above. The techniques described herein may be used in connection with detecting coding dependencies made in accordance with one or more of these any other aspects as may exist in code.

Techniques described in following paragraphs can be used in connection with flagging data items which have unexpected differences in the Big Endian environment and the Little Endian environment, and examining the code where the data items are referenced, such as when the data items are being initialized or otherwise assigned values.

The techniques described herein may be used in connection with detecting data incompatibilities by examining the data value associated with a particular data item in two different environments, such as the Big Endian and the Little Endian environment described herein. The actual difference between the data items in the Big Endian and Little Endian environments is compared to an expected difference of the particular data item. In the event that the expected difference is not the same as the actual difference of a data item, the data item may be characterized as a data incompatibility candidate. The one or more source code statements at which this particular data item is referenced, such as, for example, where a variable may be initialized or otherwise assigned a value, may be examined. The particular source code statements corresponding to the data item flagged as a data incompatibility candidate may be examined to determine if the source code includes a coding incompatibility due to the source code being written in accordance with assumptions or dependencies of one particular environment. The source code written in accordance with the dependencies may cause the resulting executable code for each of the two environments to produce unexpected differences. Accordingly, such source code statements may be flagged and examined to determine if such statements should be rewritten to be Endian independent.

Figure 5:
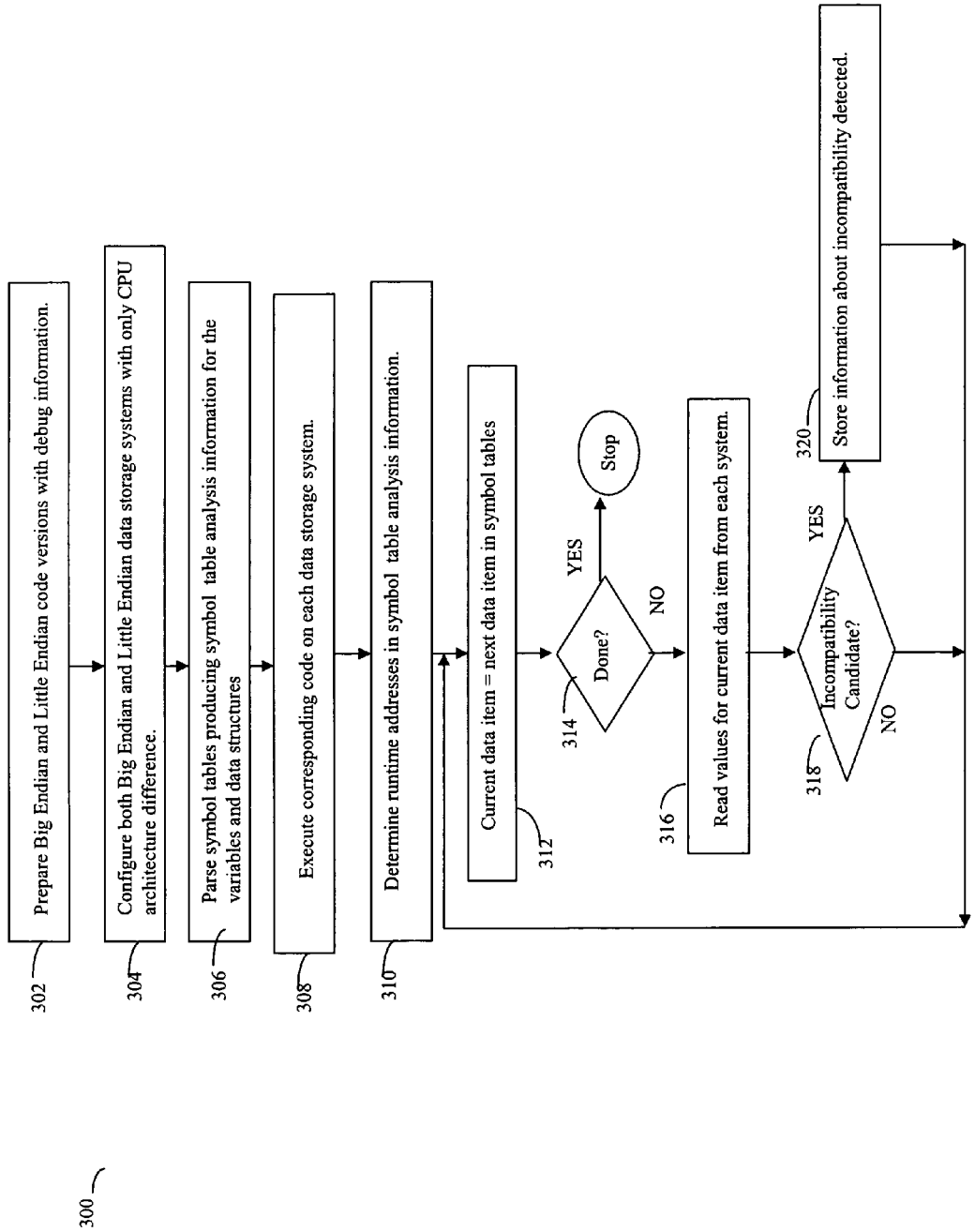
FIG. 5 is a flowchart of processing steps that may be performed in an embodiment to determine incompatibility candidate data items.

Referring now to FIG. 5, shown is a flowchart of processing steps that may be performed in an embodiment in connection with determining data incompatibility candidates. The steps of flowchart 300 may be executed, for example, by code executing in the host system 12a. The flowchart 300 begins at step 302 where both Big Endian and Little Endian executable code versions are prepared from a single set of source code or source modules. The executable code for both the Big Endian and Little Endian processor architectures may be prepared with debug information, such as, for example, by compiling with corresponding debug options. The resulting executable code includes additional information as known to those of ordinary skill and the art used in connection with executing the program under the control of a debugger. The additional information may include, for example, additional variable information, source code line information, and the like, to enable proper execution in debug mode. The steps of how to prepare a debug version of executable code may vary in accordance with each particular embodiment, for example, in accordance with the compiler or other translator and programming language used in an embodiment.

At step 304, both the Big Endian and Little Endian data storage systems may be configured such that there is preferably only a difference related to the CPU architecture and its associated conventions. In other words, the number of differences between the two data storage systems upon which the two code versions will be executed should have minimal differences. Preferably, the only difference should be related to the CPU architecture upon which the code executes. Accordingly, differences such as data incompatibilities may attributed to the CPU architectural differences. At step 306, the debug versions of the symbol tables for both the Big Endian and Little Endian code versions are parsed and used to produce symbol table analysis information for data items such as variables and data structures. It should be noted that in connection with step 306, one embodiment may have the host 12a request information in connection with the debug symbol tables from each of data storage systems 20a and 20b. In an alternate embodiment, a copy of the debug symbol table information may be made available to the code currently executing on the host 12a using other techniques. The symbol table information used in connection with producing symbol table analysis information of the step 306 is described in more detail elsewhere herein. Data obtained from the debug symbol table information may include, for example, data item names, addresses, data type and/or size information, references to other data items used to determine addresses, and the like. As known to those of ordinary skill in the art, an address of a data item may be determined in accordance with when values for symbols referenced in connection with the address are known. The foregoing name-to-address binding for a data item may occur at a variety of different times in accordance with what types of address expressions are allowed, when forward referencing is resolved, and the like. The name-to-address binding may occur, for example, at compile time, load time, or runtime/execution time. The symbol table analysis information may include information used in connection with resolving the address of each data item as may be allowed within a particular embodiment. At step 308, the host system 12a may issue commands, such as, for example, in connection with a debugger to execute corresponding code on each of the Big Endian and Little Endian data storage systems. In one embodiment, the code executed on each of the data storage systems in connection with step 308 may exercise a large number of logical code paths through a same set of module or modules on each of the data storage systems. Both of the data storage systems may have their code execution stop at a same point in order to examine memory contents of each of the data storage systems. At step 310, any run time information needed to complete runtime address resolution for any data items may be determined. The code execution on each of the data storage systems may be stopped after a particular point in time. The values of different data items on each of the data storage systems 20a and 20b may be examined by traversing each of the data elements as specified in the symbol table analysis information. The symbol table analysis information as described in connection with other figures includes an entry for each data item or variable. At step 312, current data item is assigned the next data item as identified in accordance with the symbol table analysis information. At step 314, a determination is made as to whether all data items have been examined. If so, processing stops. Otherwise control proceeds to step 316 to read the values for the current data item from each of the data storage systems stored in accordance with both the Big Endian and Little Endian data formats. At step 318, a determination is made as to whether the difference between the actual data values is an expected difference. If not, control proceeds to step 320 to store information about the particular incompatibility detected and control proceeds to step 312 to examine the next data item. In the event that no incompatibility is detected, control proceeds from step 318 directly to step 312. It should be noted in step 320 that the information stored about a particular incompatibility detected may include, for example, the entry and associated information for the data item in the symbol table analysis information, the expected difference, and the like.

Figure 6:
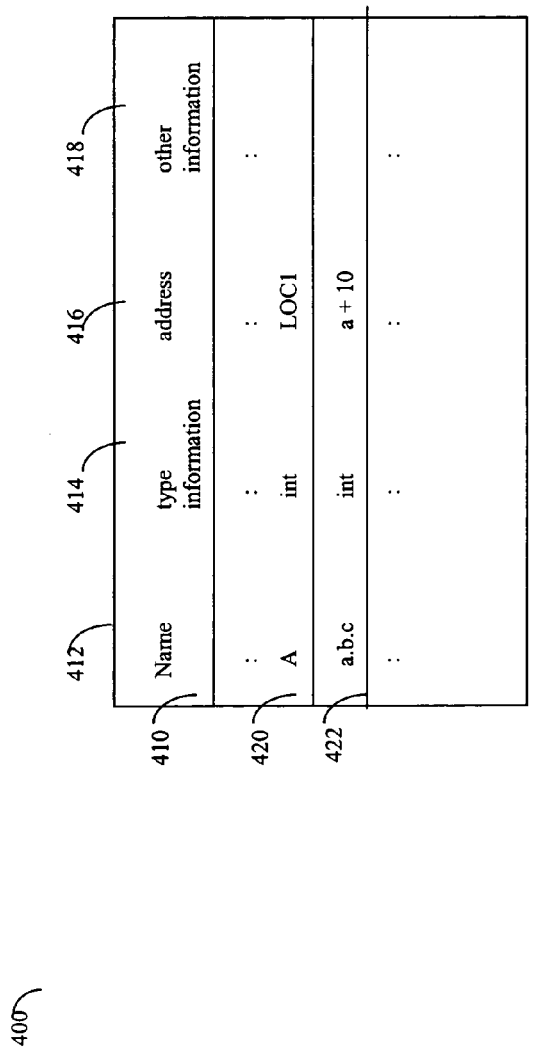
FIG. 6 is an example representation of a data structure that may be used in connection with storing symbol table analysis information.

Referring now to FIG. 6, shown is an example representation 400 of the data structure that may be used in connection with storing the symbol table analysis information as may be used in connection with performing the processing steps of flowchart 300 of FIG. 5. In this example 400, an entry or row of information 410 may be included for each particular data item. An entry may be included for each field of a record or structure. The particular association between a data item as may be defined in a language and one or more entries appearing in the symbol table analysis data structure 400 may vary in accordance with the particular records, structures, and the like, allowed in the particular language. As an example, a C structure (e.g., struct) definition may include four different fields. Each of the different fields may have a corresponding entry within the table 400. A variable, such as a single integer variable, may also result in one entry within the table 400.

Each entry 410 may include the following information about a particular data item: name 412, type information 414, address information 416, and other information 418. A name 410 may be, for example, a programmer specified variable name such as may be included in the source code. Type information 414 may include, for example, data type information. The particular data types and associated sizes of each may vary in accordance with an embodiment. Address information 416 may include the actual addresses on both data storage systems which result from address resolution and binding. An address may be represented, for example, by an address expression as illustrated in entries 420 and 422 of the table 400. Entry 420 indicates that the address of data item "A" is the value of the symbol "LOC1". In the event that LOC1 may be determined at load time, for example, the entry 420 may include a numeric value represented the address of LOC1. Entry 422 includes information about the data item "a.b.c" which may correspond, for example, to a field in a C structure. The address of "a.b.c" may be represented by the address expression "LOC2+10". If the value of LOC2 is not known until a particular point at runtime, the address field of 422 may include a representation of the expression illustrated in FIG. 6 which may be filled in with a value when known.

Data included in the other information field 418 may be used in connection with, for example, address resolution, linking together entries including references to a same data item, and the like, and may vary with each embodiment. For example, as known to those of ordinary skill in the art, address resolution may be performed in one or more passes over the table 400 and may depend, for example, on whether forward-referencing is allowed or in accordance with the complexity of the particular expressions that may be used in forming an address 416.

The execution of the steps of flowchart 300 of FIG. 5 may result in a list of data items which may be characterized as data incompatibility candidates. Once the particular data items have been determined, code referencing the particular flagged data items may be determined and the corresponding source code examined. For example, a particular portion of the code which references a variable to initialize or otherwise assign a value to a variable may be a code candidate for further examination. One or more lines of code referencing the variable may include a coding incompatibility causing the unexpected difference in the data values for the referenced variable in the Big Endian and/or Little Endian environments.

The processing of flowchart 500 of FIG. 7 will now be described which uses the list of data items flagged as being incompatibility candidates to determine code references to these data items. At step 502, information about the data incompatibility candidates detected are read in. At step 504, code execution for both the Big Endian and Little Endian debug versions is started on both of the data storage systems. When entering debug mode in an embodiment, a programmer may be given the option of setting break points. In this particular embodiment in step 506, each of the data items which has been flagged previously as a data incompatibility candidate is examined, and one or more break points may be set in the code on both of the data storage systems for references to that particular data item. When one or more of these break points have been reached and particular code at these break points examined, processing may proceed with a next data item for which additional break points may be set. At step 506, processing proceeds with the next data item. At step 508 a determination is made as to whether processing for all of the data incompatibility candidates has been completed. If so, processing stops. Otherwise control proceeds to step 510 to set a break point in the code on both these storage systems for references to the current data item. At step 512, code is executed in both these storage systems until break points are reached. At step 514, source code corresponding to the particular break point locations may be examined to determine if the source code should be modified to rewrite any source code statements causing the data incompatibility. At step 516, a determination is made as to whether processing for the current data item is complete. Processing of a current data item may be complete, for example, when a particular number of references to the current data item have been examined by stopping at one or more break points. If processing is complete for the current data item, control proceeds to step 506 to process the next data item. Otherwise, if processing is not complete for the current data item, control proceeds to step 512 to resume execution on both data storage systems until another break point is reached associated with a reference to the current data item.

Figure 7:
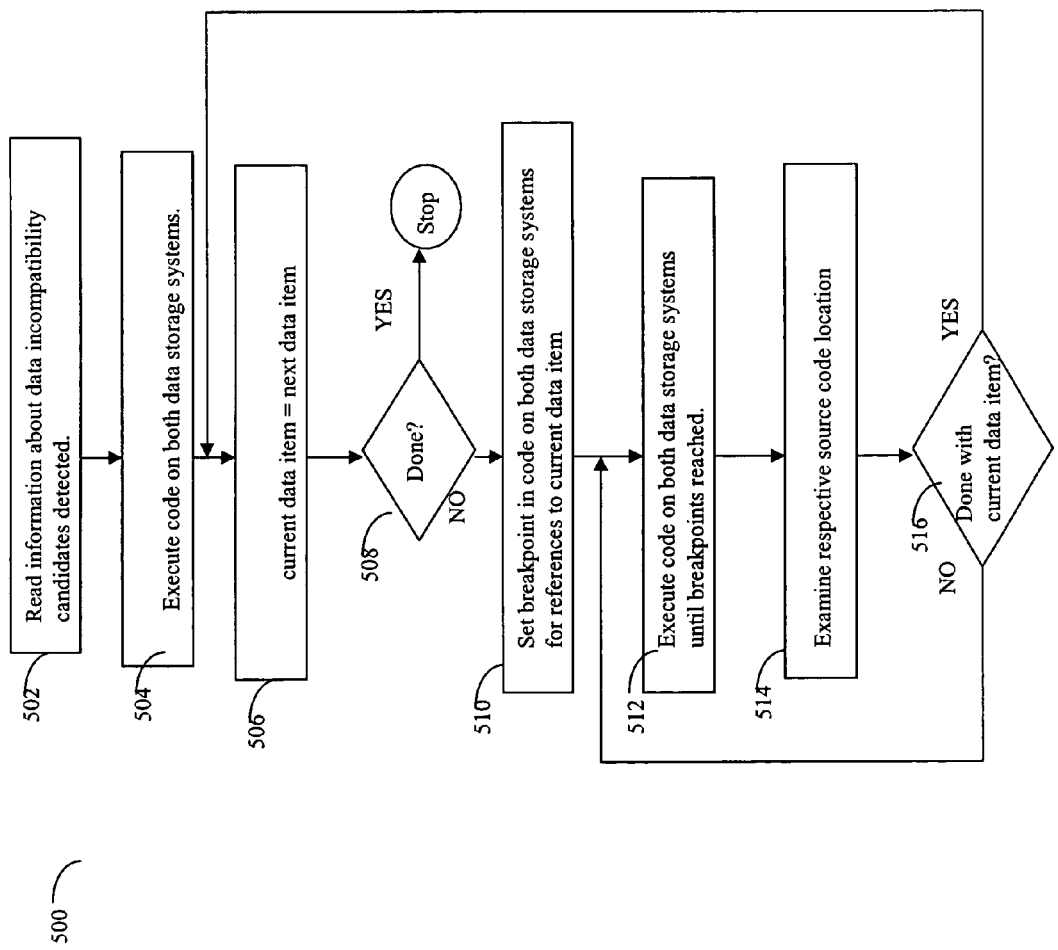
FIG. 7 is a flowchart of processing steps that may be performed in an embodiment to determine code references to the data items determined as a result of executing the steps of the flowchart of FIG. 5.

It should be noted that the processing steps of flowchart 500 of FIG. 7 may be executed, for example, by code on a host system such as 12*a*. The steps of flowchart 500 of FIG. 7 may be executed subsequent to obtaining a list of data items resulting from executing the steps of flowchart 300 of FIG. 5. The steps of flowchart 300 of FIG. 5 and 500 of FIG. 7 may be characterized as collectively representing an overall two step process. The list of data items flagged as possible data incompatibilities may be determined (e.g., flowchart 300). Subsequently, break points may be set to examine code which references the data items (e.g., flowchart 500). Alternatively, it should be noted that an embodiment may combine the steps of flowcharts 300 and 500, for example, by setting break points as each data incompatibility candidate is determined. For example, referring back to flowchart 300 of FIG. 5, additional processing may be performed after step 320, or in place of 320. The additional processing may include setting a break point causing execution to stop and the next reference to that particular data item.

The foregoing describes a technique for determining data incompatibilities between two different environments for handling memory accesses. In the example described herein, the incompatibility may be related to data byte ordering caused by code written in accordance with coding dependencies particular to one environment. However, the incompatibility may be related to other computing environmental differences.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer-implemented method for detecting incompatibilities comprising:
    determining a first contents of a data item, wherein said first contents is a first formatted data value of the data item assigned to the data item by a statement of a program during execution of the program by a first processor having a first processor architecture, said first formatted data value having a representation in accordance with a first set of conventions associated with the first processor architecture;
    determining a second contents of said data item, wherein said second contents is a second formatted data value of the data item assigned to the data item by a statement of the program during execution of the program by a second processor having a second processor architecture, said second formatted data value having a representation in accordance with a second set of conventions associated with the second processor architecture and including at least one convention that is not included in said first set; determining an expected data value using one of said first contents and said second contents;
    determining whether said expected data value and another of said first contents and said second contents are different; and
    if said expected data value and said another are different, determining said data item as an incompatibility candidate, wherein said determining an expected data value includes swapping an ordering of bytes of said one of said first contents and said second contents, and said determining whether said expected data value and another of said first contents and said second contents are different includes comparing said expected data value and said another of said first contents and said second contents.

2. The method of claim 1, wherein said first set of conventions includes at least a first convention specifying that data is stored in a memory accordance with a first byte ordering and said second set of conventions includes at least a second convention specifying that data is stored a memory in accordance with a second different byte ordering.

3. The method of claim 2, wherein said first convention specifies that a most significant byte of data of said data item is stored in a lowest memory address of a storage location associated with said data item.

4. The method of claim 3, wherein said second convention specifies that a least significant byte of data of said data item is stored in a lowest memory address of a storage location associated with said data item.

5. The method of claim 4, further comprising:
    determining a source code statement including at least one reference to said data item wherein said source code statement includes code written in accordance with one of said first convention or said second convention causing said another of said first contents and said second contents to vary from said expected data value.

6. The method of claim 1, wherein said first processor architecture is included in a component of a first type in a first data storage system, and said second processor architecture is included in component of said first type in a second data storage system.

7. The method of claim 1, further comprising:
    determining at least one of a first address associated with a first memory location of said first contents and a second address associated with a second memory location of said second contents using debug symbol table information.

8. A computer-implemented method for detecting incompatibilities comprising:
    determining a first contents of a data item in accordance with a first set of conventions associated with a first processor architecture;
    determining a second contents of said data item in accordance with a second set of conventions associated with a second processor architecture and including at least one convention that is not included in said first set;
    determining an actual difference between said first contents and said second contents;
    determining whether said actual difference is expected; and
    if said actual difference is not expected, determining said data item as an incompatibility candidate;
    determining at least one of a first address associated with a first memory location of said first contents and a second address associated with a second memory location of said second contents using debug symbol table information;
    preparing a first code set including debug information for execution by said first processor architecture; and
    preparing a second code set including debug information for execution by said second processor architecture, said first and second code sets being produced using at least a same portion of source code, said portion of source code including at least one source code statement referencing said data item, said at least one source code statement being written in accordance with a first convention included in only one of said first or said second sets of conventions, said at least one source code statement causing said actual difference to be unexpected.

9. A system comprising:
    a first data storage system including a first processor architecture operating in accordance with a first set of conventions;
    a second data storage system including a second processor architecture operating in accordance with a second set of conventions including at least one convention that is not included in said first set;
    a host comprising code that:
        determines an expected data value using one of a first contents of a data item stored in said first data storage system and a second contents of said data item stored in said second data storage system, wherein said first contents is a first formatted data value of the data item assigned to the data item by a statement of the program during execution of the program on the first data storage system, said first formatted data value having a representation in accordance with the first set of conventions associated with the first processor architecture, wherein said second contents is a second formatted data value of the data item assigned to the data item by a statement of the program during execution of the program on the second data storage system, said second formatted data value having a representation in accordance with the second set of conventions associated with the second processor architecture;

determines whether said expected data value and another of said first contents and said second contents are different; and if said expected data value and said another are different, determines said data item as an incompatibility candidate, and wherein the code that determines an expected data value includes code that swaps an ordering of bytes of said one of said first contents and said second contents, and the code that determines whether said expected data value and another of said first contents and said second contents are different includes code that compares said expected data value and said another of said first contents and said second contents.

10. The system of claim 9, wherein said first set of conventions includes a first convention specifying that a most significant byte of data of said data item is stored in a lowest memory address of a storage location associated with said data item, and said second set of conventions includes a second convention specifying that a least significant byte of data of said data item is stored in a lowest memory address of a storage location associated with said data item.

11. A computer readable medium comprising code stored thereon that detects incompatibilities, the computer readable medium comprising code stored thereon that:

determines a first contents of a data item, wherein said first contents is a first formatted data value of the data item assigned to the data item by a statement of a program during execution of the program by a first processor having a first processor architecture, said first formatted data value having a representation in accordance with a first set of conventions associated with the first processor architecture;

determines a second contents of said data item, wherein said second contents is a second formatted data value of the data item assigned to the data item by a statement of the program during execution of the program by a second processing having a second processor architecture, said second formatted data value having a representation in accordance with a second set of conventions associated with said second processor architecture and including at least one convention that is not included in said first set;

determines an expected data value using one of said first contents and said second contents;

determines whether said expected data value and another of said first contents and said second contents are different; and if said expected data value and said another are different, determines said data item as an incompatibility candidate, and wherein the code that determines an expected data value includes code that swap an ordering of bytes of said one of said first contents and said second contents, and the code that determines whether said expected data value and another of said first contents and said second contents are different includes code that compares said expected data value and said another of said first contents and said second contents.

12. The computer readable medium claim 11, wherein said first set of conventions includes at least a first convention specifying that data is stored in a memory accordance with a first byte ordering and said second set of conventions includes at least a second convention specifying that data is stored a memory in accordance with a second different byte ordering.

13. The computer readable medium of claim 12, wherein said first convention specifies that a most significant byte of data of said data item is stored in a lowest memory address of a storage location associated with said data item.

14. The computer readable medium of claim 13, wherein said second convention specifies that a least significant byte of data of said data item is stored in a lowest memory address of a storage location associated with said data item.

15. The computer readable medium of claim 14, further comprising code stored thereon that:

determines a source code statement including at least one reference to said data item wherein said source code statement includes code written in accordance with one of said first convention or said second convention causing said another of said first contents and said second contents to vary from said expected data value.

16. The computer readable medium of claim 11, wherein said first processor architecture is included in a component of a first type in a first data storage system, and said second processor architecture is included in component of said first type in a second data storage system.

17. The computer readable medium of claim 11, further comprising code stored thereon that:

determines at least one of a first address associated with a first memory location of said first contents and a second address associated with a second memory location of said second contents using debug symbol table information.

18. A computer readable medium comprising code stored thereon that detects incompatibilities, the computer readable medium comprising code stored thereon that:

determines a first contents of a data item in accordance with a first set of conventions associated with a first processor architecture;

determines a second contents of said data item in accordance with a second set of conventions associated with a second processor architecture and including at least one convention that is not included in said first set;

determines an actual difference between said first contents and said second contents;

determines whether said actual difference is expected;

if said actual difference is not expected, determines said data item as an incompatibility candidate;

determines at least one of a first address associated with a first memory location of said first contents and a second address associated with a second memory location of said second contents using debug symbol table information;

prepares a first code set including debug information for execution by said first processor architecture; and prepares a second code set including debug information for execution by said second processor architecture, said first and second code sets being produced using at least a same portion of source code, said portion of source code including at least one source code statement referencing said data item, said at least one source code statement being written in accordance with a first convention included in only one of said first or said second sets of conventions, said at least one source code statement causing said actual difference to be unexpected.

19. The method of claim 1, further comprising:

executing a portion of code on said first processor architecture, wherein said first contents are produced as a result of said executing said portion of code on said first processor architecture; and executing said portion of code on said second processor architecture, wherein said second contents are produced as a result of said executing said portion of code on said second processor architecture, wherein said determining an expected data value and said determining whether said expected data value and another of said first contents and said second contents are different are performed after said executing a portion of code on said first processor architecture and after said executing said portion of code on said second processor architecture.

20. The computer readable medium of claim 11, wherein one of the first processor architecture and the second processor architecture uses little endian data formatting and another of the first processor architecture and the second processor architecture uses big endian data formatting.

* * * * *